US012612891B2

(12) United States Patent
Talukdar

(10) Patent No.: US 12,612,891 B2
(45) Date of Patent: Apr. 28, 2026

(54) HYDROELECTRIC POWER GENERATION UTILIZING TIDAL FLOWS AND CORIOLIS FORCE

(71) Applicant: Subrata Talukdar, San Antonio, TX (US)

(72) Inventor: Subrata Talukdar, San Antonio, TX (US)

( * ) Notice: Subject to any disclaimer, the term of this patent is extended or adjusted under 35 U.S.C. 154(b) by 0 days.

(21) Appl. No.: 19/293,888

(22) Filed: Aug. 7, 2025

(65) Prior Publication Data

US 2026/0043387 A1 Feb. 12, 2026

Related U.S. Application Data

(60) Provisional application No. 63/681,433, filed on Aug. 9, 2024.

(51) Int. Cl.
*F03B 13/26* (2006.01)
*F03B 13/10* (2006.01)

(52) U.S. Cl.
CPC .............. *F03B 13/26* (2013.01); *F03B 13/10* (2013.01)

(58) Field of Classification Search
CPC ........... F03B 13/26; F03B 13/10; F03B 13/12
USPC ...................................................... 290/42, 53
See application file for complete search history.

(56) References Cited

U.S. PATENT DOCUMENTS 7,564,144 B1 * 7/2009 Srybnik .................. F03B 13/10 290/43
8,164,209 B2 * 4/2012 Rovinsky .............. F03B 17/061 290/52
8,269,364 B2 * 9/2012 Lai .......................... F03B 13/26 290/53
9,803,614 B2 * 10/2017 Williams ................ F03B 13/08
2008/0116692 A1 * 5/2008 Lagstrom .............. F03B 17/063 415/7
2010/0001530 A1 * 1/2010 Chang ..................... F03B 13/10 415/60

* cited by examiner

*Primary Examiner* — Michael L Sehn
(74) *Attorney, Agent, or Firm* — Barry Choobin; Patent 360

(57) ABSTRACT

A system and method for harnessing and converting tidal energy into electricity utilizes the predictable nature of tidal phenomena. The system captures the Coriolis force, an inertial force imparted to a moving fluid by Earth's rotation, through a low-head turbine. The system creates a potential water column difference using multiple reservoirs and a tide capture/release algorithm. Water flows down this gradient through the turbine chamber to a lower potential energy reservoir, regulated by pump-assisted buoyant valve locks. The turbine design captures the summated rotational energy from the rotating water body created by the forced vortex and the Coriolis force as it exits the turbine chamber. This system provides a reliable, environmentally friendly, and virtually endless source of energy.

19 Claims, 9 Drawing Sheets

HYDROELECTRIC POWER GENERATION UTILIZING TIDAL FLOWS AND CORIOLIS FORCE

CROSS REFERENCE TO RELATED APPLICATIONS

This application claims priority from a U.S. Provisional Patent Appl. No. 63/681,433, filed on Aug. 9, 2024, which is incorporated herein by reference in its entirety.

FIELD OF INVENTION

The present invention relates to renewable power generation, and more specifically, the present invention relates to hydroelectric power generation utilizing tidal energy and Coriolis forces.

BACKGROUND

Global warming driven by carbon emissions has compelled nations to shift their energy generation strategies from fossil fuels to renewable energy sources. As a result, the field of renewable energy has witnessed substantial advancements. Coastal nations, in particular, have recognized the untapped potential of tidal energy as a significant contributor to their renewable energy portfolio. However, despite ongoing progress, the practical and efficient harnessing of tidal energy remains a considerable challenge.

A major challenge lies in the limited efficiency of power generation during intertidal periods. Other offshore renewable energy systems are expensive to construct and maintain, with additional logistical and financial burdens associated with transmitting power from distant offshore locations to onshore grids. For tide-based systems, the operational efficiency of such systems often drops significantly during intertidal periods, adversely affecting the overall energy output.

Another issue is the temporal mismatch between renewable energy generation and peak consumption demand. Energy generated from tidal and other renewable sources does not always coincide with periods of high energy demand, necessitating the deployment of large-scale batteries or other energy storage systems. These storage solutions contribute additional cost and complexity to the overall energy infrastructure.

Existing technologies have attempted to overcome these challenges, but with limited success. For example, vortex-based energy systems have shown promise in low-head environments; however, they typically require continuously flowing water sources to function effectively. Current turbine designs generally focus on harvesting rotational energy concentrated near the vortex center, potentially missing opportunities for more efficient energy extraction.

Other tidal energy systems attempt to utilize active tidal flows by channeling wave crests or manipulating water flow through baffling at various ocean depths. Nevertheless, these systems are often based on unidirectional flow turbines, which are ineffective or inoperable during intertidal periods when water movement is minimal.

In summary, despite ongoing innovation in the field of renewable hydropower, several technical and environmental challenges persist. These include high installation and maintenance costs, inefficiencies during intertidal periods, the need for substantial water head differentials, and the misalignment between power generation cycles and consumer demand peaks.

Accordingly, there exists a need for improved systems and methods for harnessing tidal energy that address the limitations of current technologies. Specifically, there is a need for solutions that can operate efficiently during intertidal periods, reduce infrastructure and maintenance costs, better align energy generation with consumption cycles, and enhance overall energy capture efficiency in tidal environments.

SUMMARY OF THE INVENTION

The following provides a simplified summary of one or more embodiments of the present invention to facilitate a basic understanding of its features and advantages. This summary is not an exhaustive overview of all contemplated embodiments and is not intended to identify essential elements or define the full scope of the invention. It merely introduces certain concepts that are described in greater detail in the subsequent sections.

The present invention provides a novel method and system for harnessing and converting tidal energy into electricity. By utilizing the predictable and globally observable tidal phenomena, the invention delivers a reliable and renewable energy source with minimal environmental impact following installation, and during maintenance, repair, or replacement operations.

A key innovation of the invention lies in its ability to capture the Coriolis force—an inertial force imparted on a moving body of fluid due to Earth's rotation. This natural force, typically observed in large-scale phenomena such as whirlpools, tornadoes, cyclones, or hurricanes, is harnessed by creating a controlled potential water column difference between multiple reservoirs. A tide capture and release algorithm regulates water flow through a turbine chamber along this potential gradient, thereby capturing the energy associated with the Coriolis-induced vortex The turbine design of the present invention is configured to extract the summated rotational energy generated by the interaction between a forced vortex and the Coriolis force. The system comprises a network of reservoirs, flow channels, gates, and turbines that together facilitate water movement through the turbine chamber. This controlled flow generates a vortex in the chamber, from which rotational energy is efficiently converted into electrical energy.

Unlike conventional land-based hydroelectric systems, the invention is implemented in natural or engineered coves along coastlines. These coves facilitate the formation of low-cost reservoirs and turbine housing, significantly reducing land use and associated environmental disruption. Moreover, the reservoir system can serve as a protected habitat for marine life, enhanced by integrated grates and baffles that mitigate ecological harm.

The invention is capable of generating power during intertidal periods, overcoming a critical limitation of many existing tidal energy systems. This is enabled by a tide management algorithm (TMA) that optimizes flow control. The system operates effectively under very low head conditions using a super low head turbine (SLHT), relying primarily on the Coriolis force and minimal potential energy differentials for power generation. This unique design (SLHT) has the potential for power generation of significant magnitude along a river course without the creation of Mega dams and hence limiting environmental disruption.

The proximity of the reservoir and turbine systems to the shoreline allows for cost-effective maintenance and efficient energy transmission. Reservoir walls may be designed to support roads or walkways, providing easy access to turbine housing. Additionally, during periods of low energy demand or surplus production, the system can store water in the reservoirs as potential energy, thereby offsetting peak demand without the need for costly battery storage solutions with limited life spans.

BRIEF DESCRIPTION OF DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
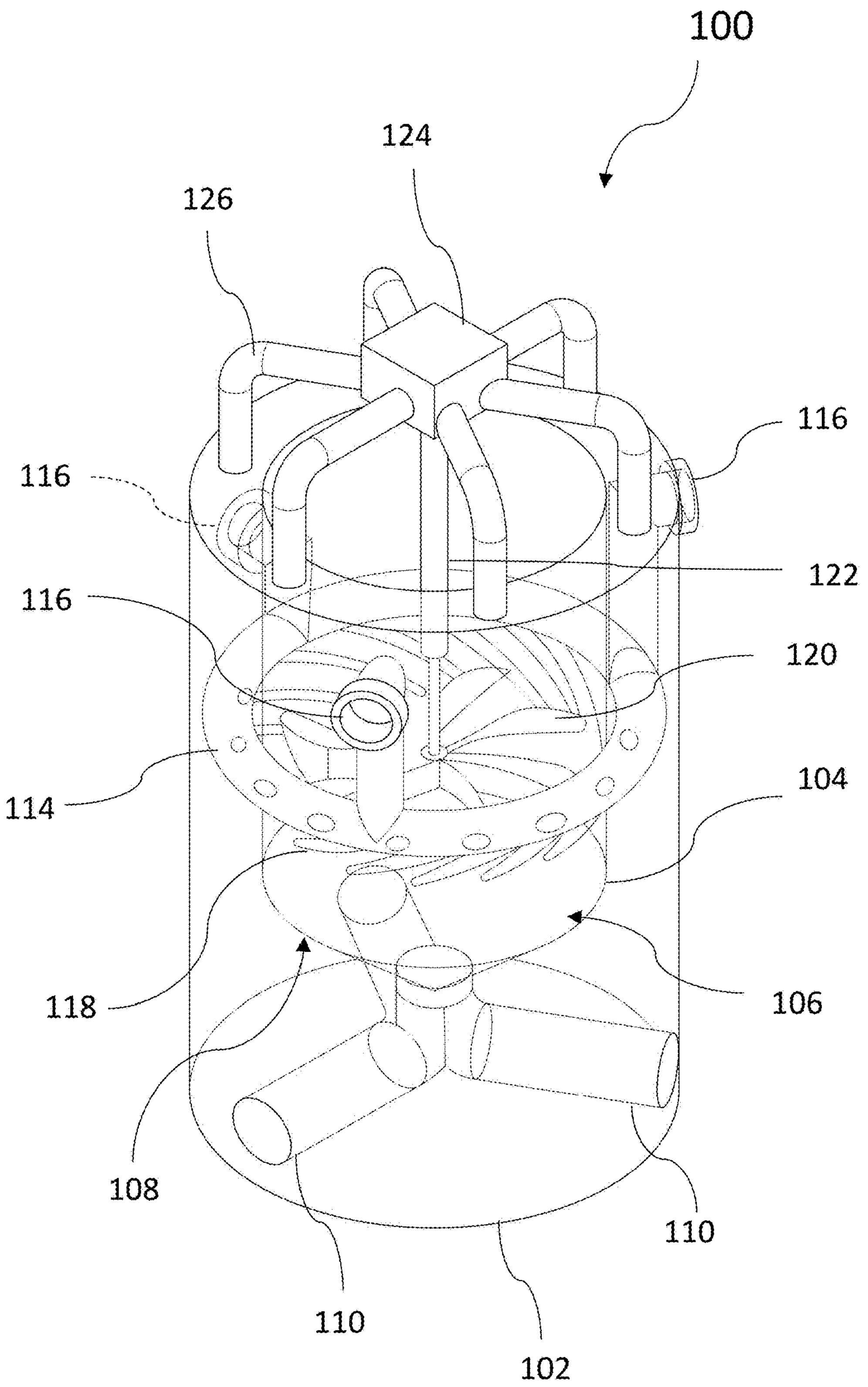
FIG. 1 shows a perspective view of a system in which the turbine housing is shown transparent, according to an exemplary embodiment of the present invention.
Figure 2:
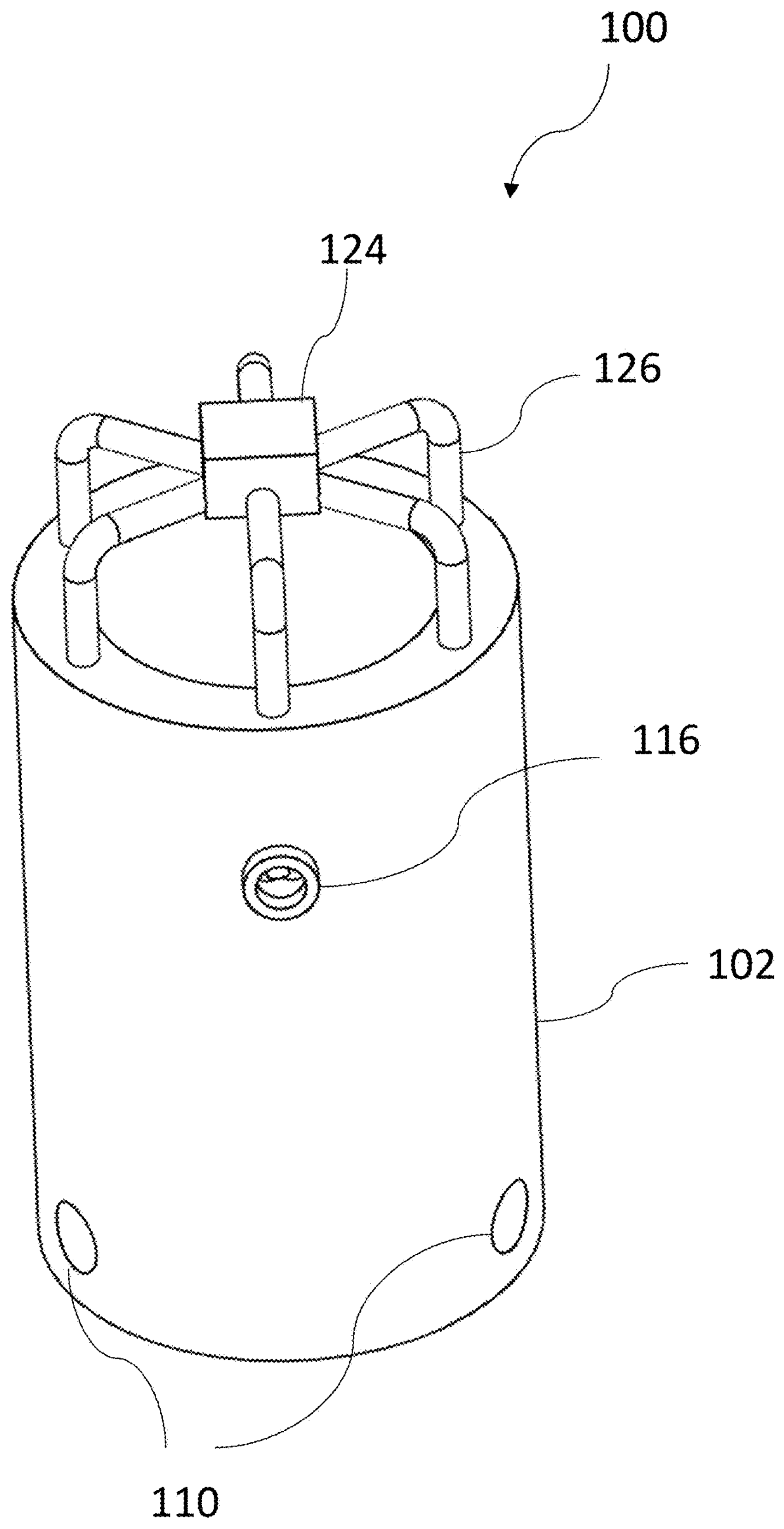
FIG. 2 shows another perspective view of the system, according to an exemplary embodiment of the present invention.
Figure 3:
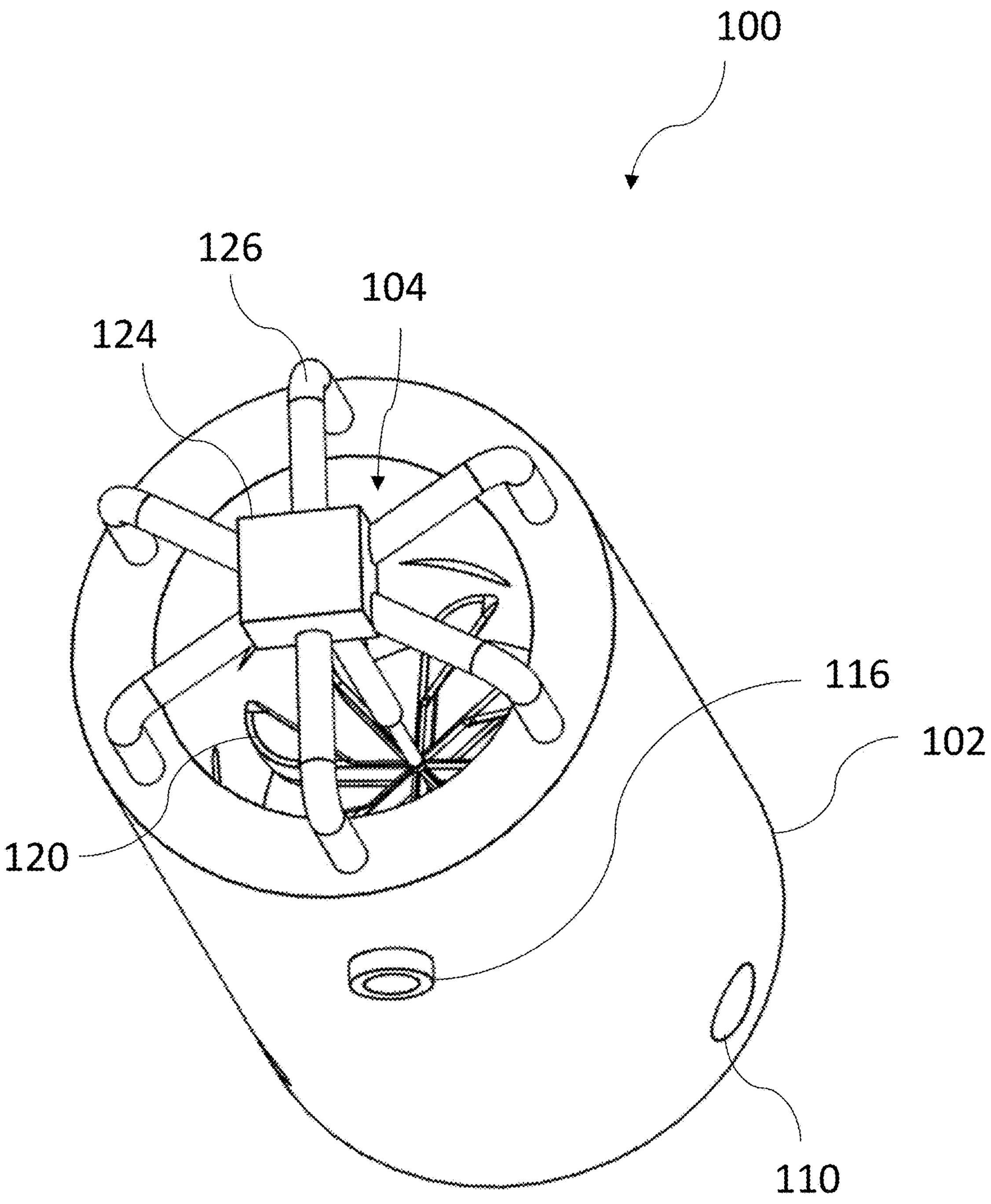
FIG. 3 shows another perspective view of the system more clearly showing the inner view, according to an exemplary embodiment of the present invention.

The subject matter of the present invention will now be described more fully with reference to the accompanying drawings, which form a part of this disclosure and illustrate specific exemplary embodiments. However, it should be understood that the subject matter may be embodied in various forms and is not limited to the specific embodiments set forth herein. Rather, these embodiments are provided by way of example to convey the scope of the invention. It is intended that the claims encompass a broad range of subject matter, including methods, devices, components, and systems. Accordingly, the following detailed description is not intended to be taken in a limiting sense.

As used herein, the term “exemplary” is intended to mean “serving as an example, instance, or illustration.” Any embodiment described as “exemplary” should not be construed as preferred or more advantageous over other embodiments. Similarly, the expression “embodiments of the present invention” does not imply that all embodiments must include all features, advantages, or modes of operation described.

The terminology used herein is for the purpose of describing particular embodiments only and is not intended to be limiting. As used herein, the singular forms “a,” “an,” and “the” include plural references unless the context clearly dictates otherwise. Furthermore, the terms “comprises,” “comprising,” “includes,” and/or “including” specify the presence of stated features, integers, steps, operations, elements, or components, but do not preclude the presence or addition of one or more other features, integers, steps, operations, elements, components, and/or groups thereof.

The following detailed description sets forth the best currently contemplated modes for carrying out exemplary embodiments of the invention. This description is not intended to be limiting, but rather to illustrate the general principles of the invention. The claims of any issued patent will define the scope of the invention.

The present invention relates to a hydroelectric power generation system that utilizes tidal flows and the Coriolis force to efficiently harness renewable energy. The invention is described with reference to various components and structural elements; however, it should be understood that while these elements are described individually for clarity, they are not necessarily required to be distinct or separable in all embodiments. In certain configurations, multiple components may be integrated, fabricated as a unitary structure, or molded from a single block of material. The construction and arrangement of components may vary in form and implementation without departing from the spirit or scope of the invention as set forth in the claims.

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices and parts that are connected to each other need not be in continuous connection with each other, unless expressly specified otherwise. In addition, devices and parts that are connected with each other may be connected directly or indirectly through one or more connection means or intermediaries.

A description of an aspect with several components in connection with each other does not imply that all such components are required. To the contrary, a variety of optional components may be described to illustrate a wide variety of possible embodiments and in order to more fully illustrate one or more embodiments.

Similarly, although process steps, method steps, or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of the processes described may be performed in any practical order. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the multiple devices or articles.

The functionality or the features of a device may be alternatively embodied by one or more other devices that are not explicitly described as having such functionality or features. Thus, other embodiments need not include the device itself.

Techniques and mechanisms described or referenced herein will sometimes be described in the singular form for clarity. However, it should be appreciated that particular embodiments may include multiple iterations of a technique or multiple instantiations of a mechanism unless noted otherwise. Alternate implementations are included within the scope of various embodiments in which, for example, functions may be executed out of order from that shown or discussed, including substantially concurrently or in reverse order, depending on the functionality involved, as would be understood by those having ordinary skill in the art.

The invention described relates to a tidal energy conversion system that utilizes tidal flows and Coriolis forces for power generation. Referring to FIG. 1, which shows a perspective view of system 100 that includes a turbine housing 102 and a vortex chamber 104 encased within the housing 102. The vortex chamber 104 includes an upper cylindrical portion 106 and a conical base 108. The turbine housing 102 has three reservoir inlets 110 at the bottom of the turbine housing 102. These reservoir inlets are 110 connected to the tip of the conical base 108 through pipes and channels.

A central conduit 114 is disposed near the middle of the turbine housing 102 and encircles the vortex chamber 104. Opposite ends of the central conduit are joined together to form a continuous channel. Three reservoir outlets 116 extend spatially upwards from the central conduit 114 and through the turbine housing 102. Also, the three water outlets are positioned at different heights that are appropriate for the reservoir and turbine combination based on the tidal range, i.e., the second reservoir outlet is positioned above the first reservoir outlet, and the third reservoir outlet is positioned above the second reservoir outlet.

Figure 4:
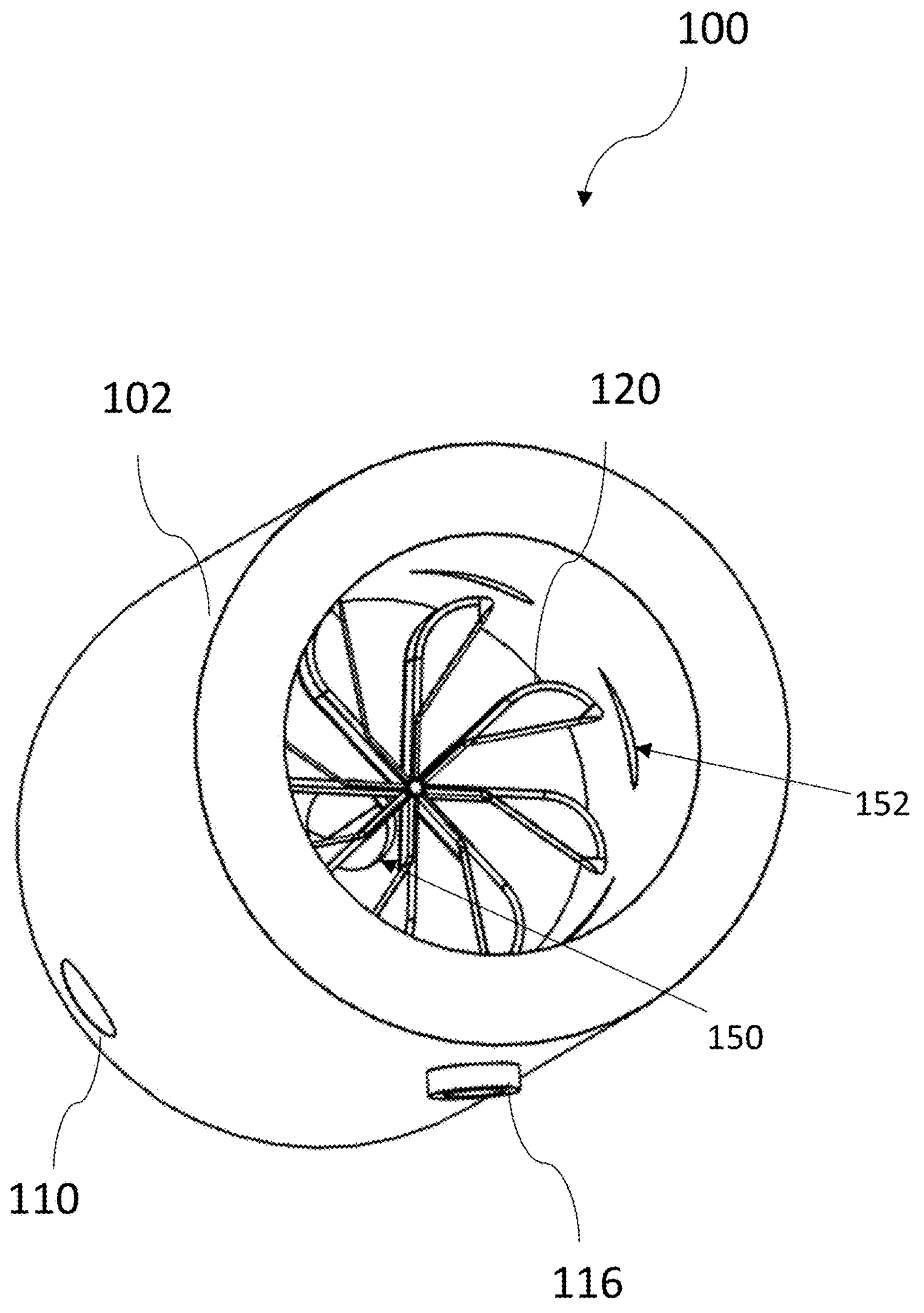
FIG. 4 shows another perspective view of the system in which the overhead gantry is removed, according to an exemplary embodiment of the present invention

Multiple directional inlets 118 extend from the central conduit 114 into the vortex chamber 104. In one embodiment, approximately fifteen directional inlets are provided, spaced apart circumferentially around the central conduit. Each directional inlet extends at an angle both sideways and downward from the central conduit toward the vortex chamber. The open tips 152 of the directional inlets are diagonally cut, as illustrated in FIG. 4, and are oriented tangentially relative to the circumference of the turbine housing to generate a forced vortex. In certain embodiments, the directional inlets open directly into the vortex chamber and preferably terminate as close as possible to the floor of the vortex chamber, proximate to the conical base.

Figure 5:
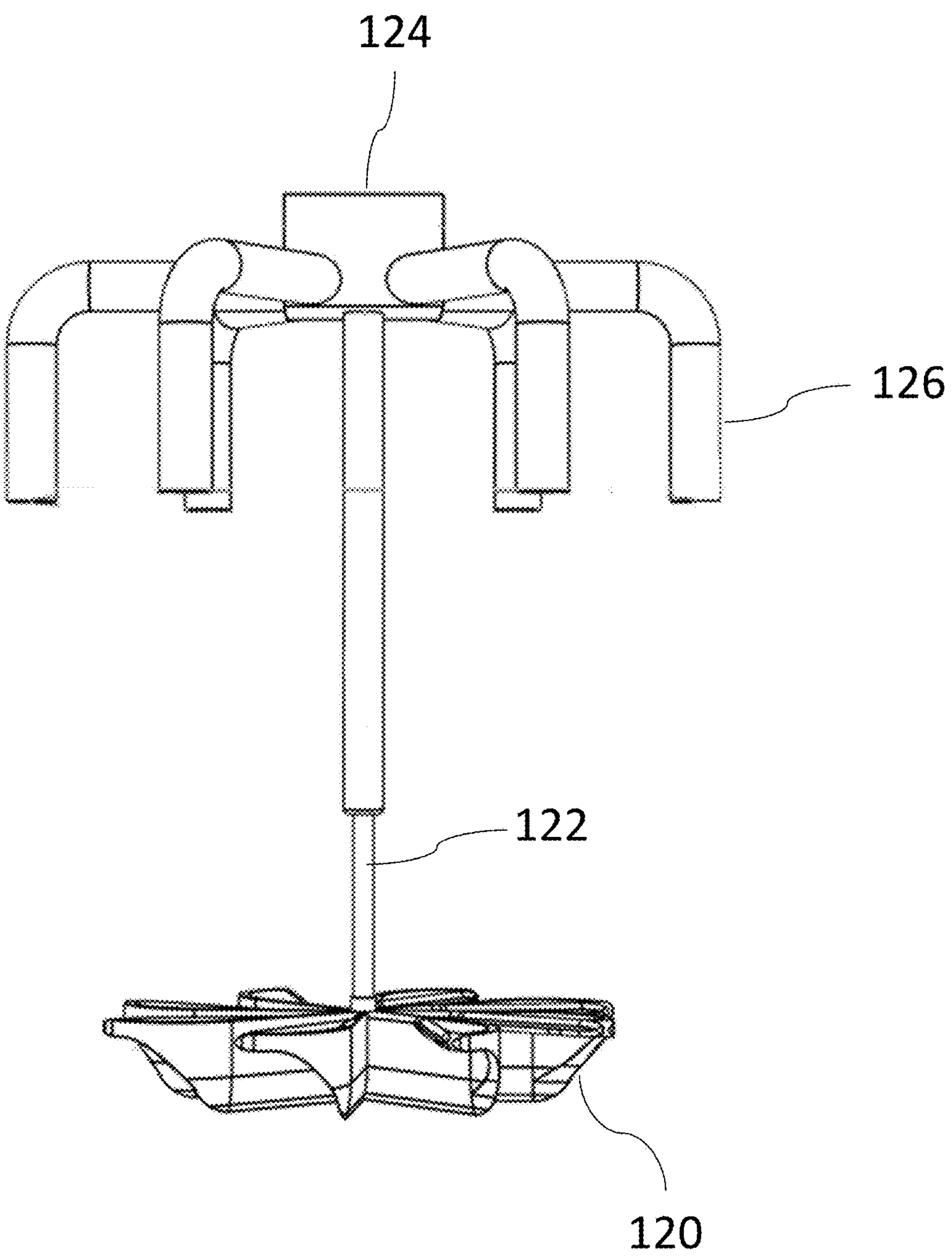
FIG. 5 shows a front view of the overhead gantry and turbine, according to an exemplary embodiment of the present invention.
Figure 6:
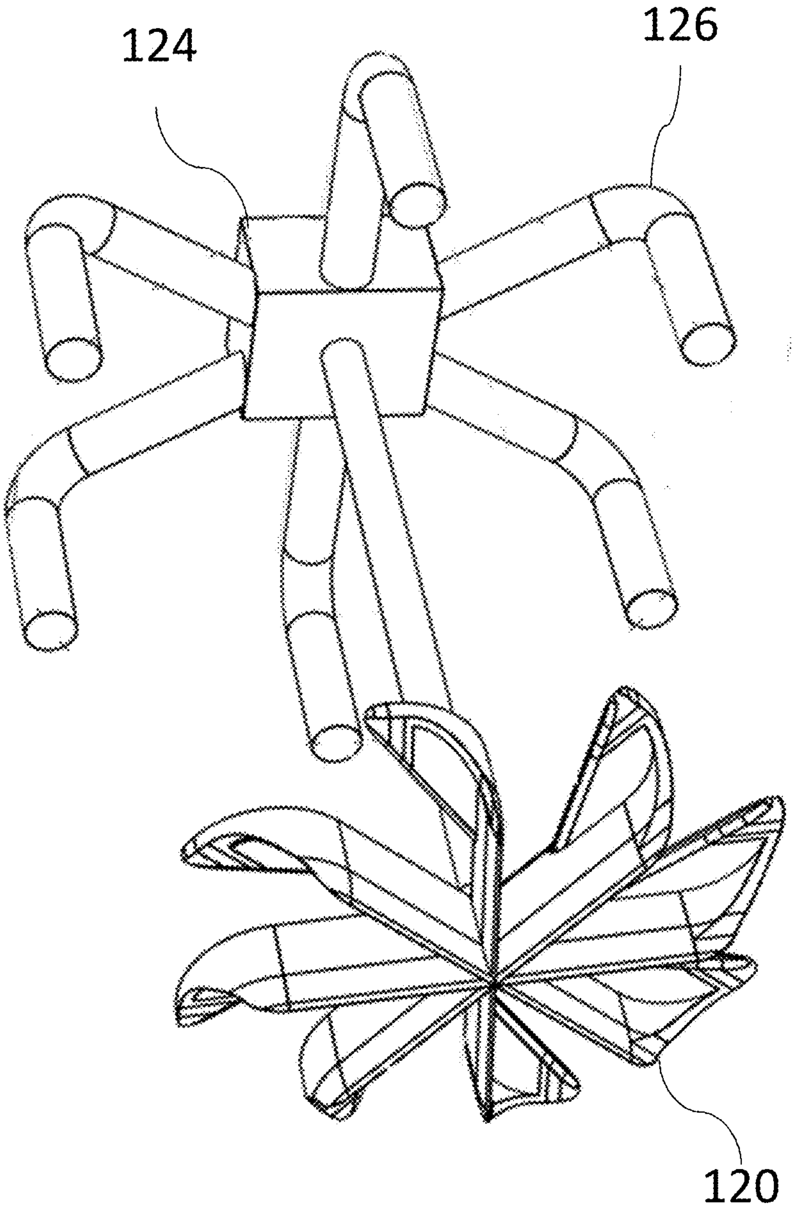
FIG. 6 shows another perspective view of the overhead gantry with the turbine, according to an exemplary embodiment of the present invention.
Figure 7:
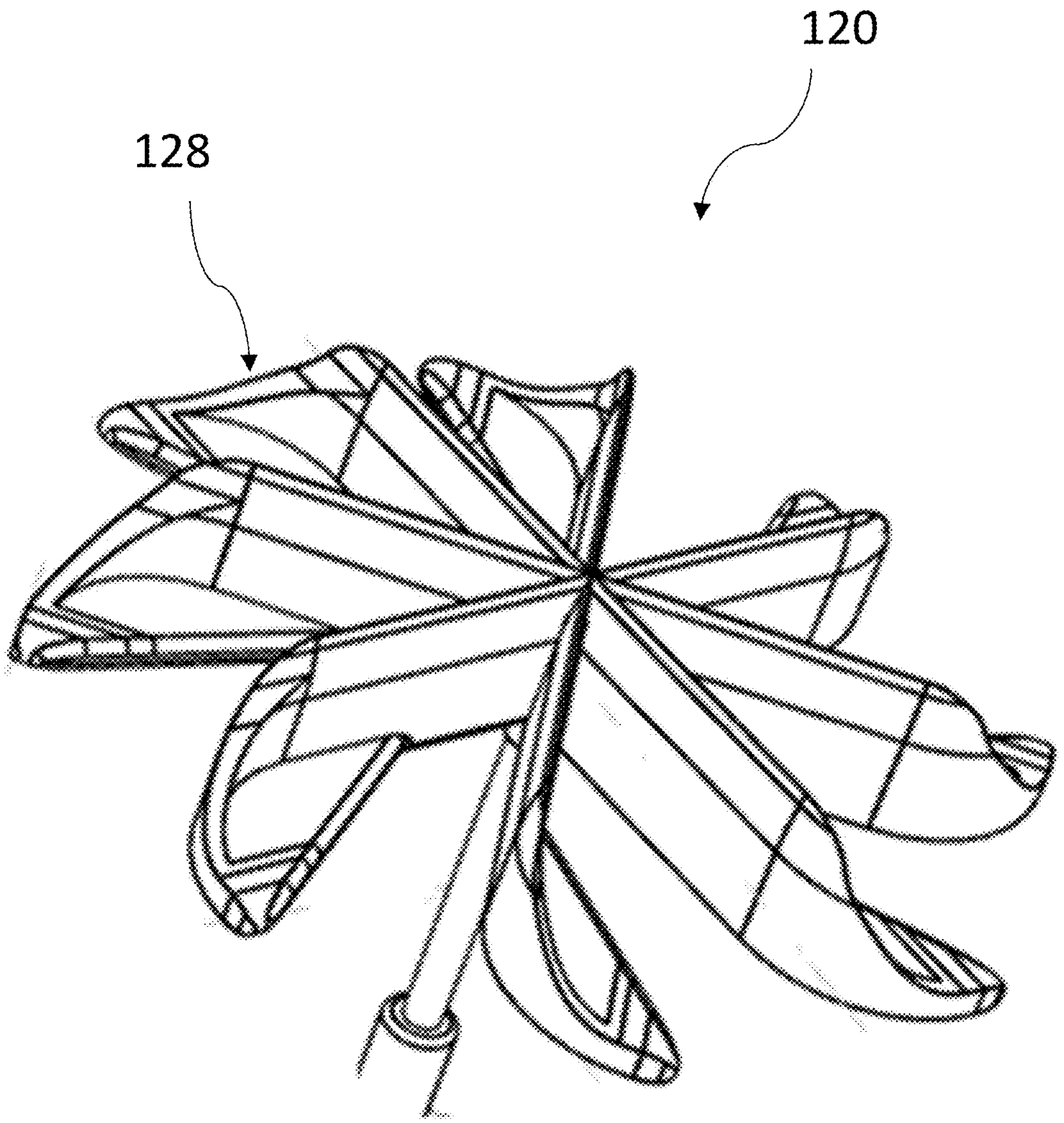
FIG. 7 shows a perspective view of the turbine, according to an exemplary embodiment of the present invention.

A turbine 120 is positioned within the vortex chamber 104, and an axle 122 connects the turbine 120 to a generator (not shown). The turbine is suspended from an overhead gantry 124 that also accommodates the generator. FIG. 5 shows an overhead gantry 124, support arms 126, axle 122, and the turbine 120 in the assembled state. FIG. 6 shows a perspective view of the system state of FIG. 5. FIG. 7 shows an enlarged view of the turbine 120. The turbine's vanes 128 are crafted to optimally harness the combined rotational energy of the water as it exits the vortex chamber. The overhead gantry 124 is spatially positioned above the turbine housing 102 with the help of support arms 126. As shown in the drawing, the support arms extend similarly to spider legs. However, such as arrangement of support arms is optional.

In certain implementations, the system may employ three reservoir outlets, each operating at different heights to maximize the capture of the Coriolis force.

In the drawings, the turbine housing is illustrated as cylindrical; however, alternative configurations may be employed. The turbine housing may be formed in various shapes, sizes, or structural arrangements based on site-specific requirements and the intensity of tidal activity. Regardless of the configuration, the primary objective remains the generation of a vortex utilizing the Coriolis force. In certain embodiments, the turbine housing may incorporate a buoyant base, enabling deployment of a single reservoir outlet rather than multiple reservoir outlets, thereby simplifying the overall system architecture and reducing costs. Additionally, in other embodiments, a circular turbine blade configuration with circumferential gears may be utilized to enhance rotational speed through gear transfer ratios, thereby increasing voltage output and improving power transmission efficiency.

Minor components integrated into the system include a generator, buoyant valves, buoyant lock gates, baffles, grates, and tubes designed to enhance the eddy formation.

This system operates synergistically to efficiently and sustainably capture and convert tidal energy into electricity. The tidal energy power generator, referred to as the CFT, operates by harnessing continuous power through a framework of reservoirs and turbines. The system leverages the Coriolis force for turbine rotation in low-head environments. It is designed to be placed strategically along ocean coves and large water bodies with substantial tidal activity while minimizing environmental disruption. This renewable energy source has no additional carbon footprint or contribution to global warming potential. To facilitate distribution, a network of transformers/switching stations can be implemented to connect these hydropower plants to the grid.

Figure 8:
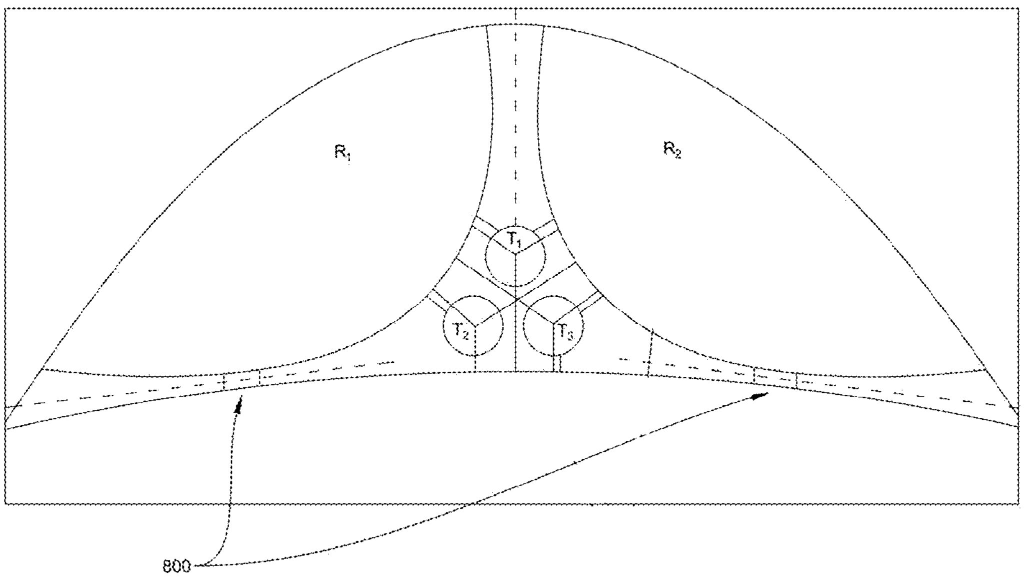
FIG. 8 illustrates the lock gates and reservoirs of the system, according to an exemplary embodiment of the present invention.

Referring to FIG. 8, the system can be optimally situated at the intersection of two reservoirs (R1 and R2) and the ocean (R3). The central conduit 114 is designed to equalize water pressure and facilitate uniform flow through all directional inlets 118 arranged circumferentially. These directional inlets 118 are directed tangentially along the turbine housing's circumference to generate a forced vortex. The conical base 108 of the vortex chamber 104 has a central outlet 150 (FIG. 4) with selectable and gated channels leading back to the paired reservoirs/ocean. This design utilizes a combination of a forced vortex, which pre-accelerates the natural vortex created by the Coriolis force, aligning with the hemisphere's Coriolis force rotational direction. Water from the ocean or reservoir enters the reservoir outlets 116, energizing the central conduit 114. As this water exits the vortex chamber 104, it is acted upon by the Coriolis force effect, which enhances the rotational momentum of the water body. The turbine 120 within the vortex chamber captures this summated energy, rotating the generator shaft to produce electricity. The model includes three fixed-height reservoir outlets with three operational ranges, regulated by the TMA.

The framework of reservoirs is typically positioned along coves and ocean inlets. FIG. 8 shows the two reservoirs R1 and R2 separated from each other and the ocean R3, and the disclosed system is positioned at the confluence point. The walls of the framework are arranged in a T shape, with the vertical line pointing toward land, although the orientation can vary depending on the geographical conditions. Sluice gates control the flow of water between the reservoirs and the ocean.

In this drawing, two reservoirs are labelled R1 and R2, and the ocean is labeled R3. These reservoirs feature inlet and outlet pipes controlled by pump-assisted buoyant valve locks. These locks selectively allow flow between reservoirs through the uniquely designed turbine housing, maximizing the Coriolis force. Turbines can operate individually or in combination based on the tide cycle timing as determined by the Tide management algorithm. The illustrated sluice gates, when opened, allow marine life to move freely between the ocean and the reservoirs.

As an alternative, the system could include multiple reservoirs with different orientations and sluice gates at various locations. The design can be optimized to accommodate the geographical constraints of its specific setting, offering flexibility in implementation.

The design of the system aids in harnessing the Coriolis force, generating a combined vortex as seawater exits the system. The turbine blades, being entrained, capture this rotational energy and transmit it up the turbine shaft to the generator. The design of the turbine allows it to be raised for maintenance and adjustment of the turbine load during periods of operation. The design of the system could allow for loading with pump-assisted water into the vortex chamber, and subsequently, the hollow blades to make them heavier to maximize power output. This load can be adjusted, gradually increased, and decreased, functioning like a gear mechanism to achieve the desired output speed and power generation by altering the turbine mass.

An alternative approach could address a potential limitation of this multiple-turbine/generator system: the synchronization of the generators for each of the turbines. During the onset and offset of the turbine, power output could drop significantly. To mitigate this, the three turbines could be equipped with circumferential gears that are connected via a coupling mechanism to a central generator. This arrangement would allow any of the turbines to operate the generator without stopping, potentially enhancing the system's overall efficiency and power output.

Tide Management Algorithm (TMA) is designed to leverage the differential height of the water column in the reservoirs. It channels seawater through the appropriate turbine, enabling continuous operation and power generation. The algorithm maintains an appropriate gradient and allows the continuous operation of one or more turbines, which can be timed to meet peak demand and reduce the need for energy storage.

The TMA illustrated here presents two scenarios: one with two reservoir outlets (T1 and T2) and another with three reservoir outlets (T1, T2, T3). Both scenarios enable continuous power production with a three-reservoir system. However, the effectiveness of each system may vary depending on the tidal range.

Figure 9:
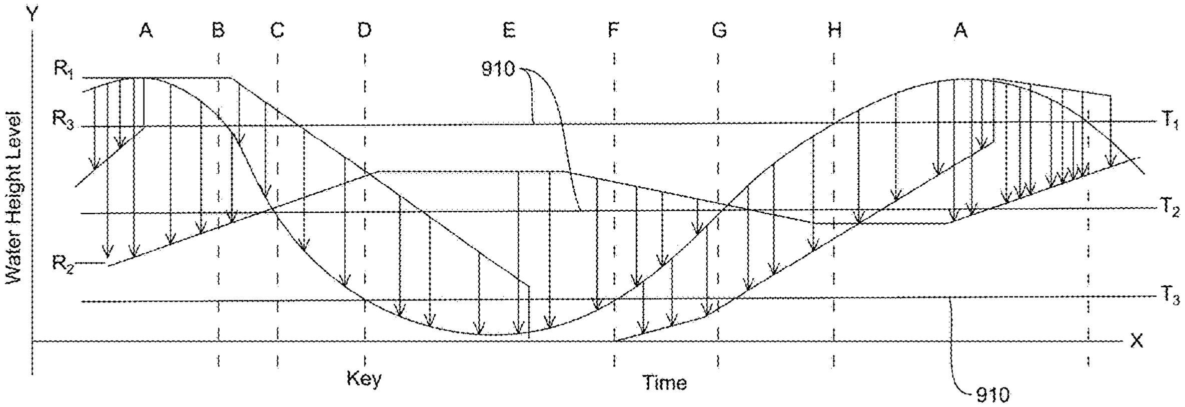
FIG. 9 illustrates the tide management algorithm, according to an exemplary embodiment of the present invention.

Referring to FIG. 9, in this schema, the x-axis represents time, and the y-axis represents the tide height range. The three horizontal lines 910 represent the three reservoir outlets (T1, T2, and T3) and their respective heights from the low tide point. T1 is above T2 and T2 is above T3, as shown in FIG. 1. At peak tide, Reservoir R1 and the ocean R3 water levels are equilibrated via the lock gate opening, and water is allowed to flow to Reservoir R2 via the outlet T1. As the ocean level R3 falls below the outlet 'T1's operational height, the outlet T2 is activated, allowing water to flow from the ocean R3 to the Reservoir R2 until it reaches point C. At this point, the ocean R3 level is lower than the outlet T2's operational height, rendering outlet T2 non-operational.

At time point B, Reservoir R1, which has not been utilized, holds water above the outlet's T1's operation height. Before point C, the Reservoir R1 starts discharging through the outlet T1 to the ocean R3, generating power. This gradient can be utilized from point B to point E to allow continuous flow and power generation. Alternatively, Reservoir R1 could use the outlet T1 to increase levels at Reservoir R2 as long as Reservoir R1's water level is above the outlet T1's operational range.

At point E, the water level for Reservoir R2 is above the outlet T2's operational height and can be used to send water to the ocean, as long as Reservoir R2's water level is above the outlet T2's operational height. Once Reservoir R2 is below the outlet T2's operational height, water from the ocean reservoir R3 is allowed into Reservoir R1, sequentially utilizing the outlets T3, T2, and T1 to generate power and continue the cycle to point A. At that level, water from the ocean is allowed to enter Reservoir R2 through the outlet T1 and generate power. Finally, Reservoir R1 and the ocean R3 are equilibrated again, and the cycle is repeated. This algorithm demonstrates continuous flow from at least one chamber to another, illustrating how the invention can support continuous power generation.

An alternative approach to this algorithm could involve modifications to optimize power generation based on reservoir size, tide heights/ranges, and local power needs. A minimum of three reservoirs and two turbines would be required for continuous power generation.

Additional Elements

The apparatus also incorporates a system of buoyant valves and lock gates 800 (shown in FIG. 8). These components are designed to open and close as needed, directing water to the appropriate reservoir and through the suitable turbine. The use of buoyant locks and pump-assisted gates helps to minimize operational energy expenditure, enhancing the overall efficiency of the system.

Additionally, the design allows for the easy inclusion of baffles and grates. These elements serve to prevent marine life from entering the system, thereby reducing potential harm to the ecosystem. The system can also incorporate curvatures in the inlet pipe to promote the formation of eddy currents and eddy pools. These pools can provide areas of refuge for marine life that may be transported within the entry pipes. At the end of the cycle, marine life can naturally swim out as the tides recede along the natural gradient. Strategically placed eddy pools can offer marine life a chance to escape the main water stream and take refuge, further promoting the system's environmental compatibility.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A method for harnessing and converting tidal energy into electricity, the method comprising:
- providing a system comprising:
  - a turbine housing;
  - a vortex chamber encased within the housing;
  - one or more reservoir inlets in fluid communication with the vortex chamber, the one or more reservoir inlets configured in the turbine housing spatially below the vortex chamber;
  - a central conduit circumferentially positioned around the vortex chamber;
  - one or more reservoir outlets extend spatially upwards from the central conduit, the one or more reservoir outlets are in fluid communication with the central conduit;
  - a plurality of directional inlets, spaced apart from each other, extend from the central conduit and open in the vortex chamber; and
  - a turbine positioned within the vortex chamber and operationally coupled to a generator; and
- generating electricity from the system using a potential water column difference between a plurality of reservoirs.

2. The method of claim 1, wherein the system is positioned at a confluence of the plurality of reservoirs.

3. The method of claim 1, wherein the method further comprises:
- implementing a tide capture/release algorithm to control flow of water down the potential water column difference through the vortex chamber for rotating the turbine.

4. The method of claim 3, wherein water enters the vortex chamber through the plurality of directional inlets, wherein the flow of water through the vortex chamber results in the formation of a vortex that drives the turbine.

5. The method of claim 4, wherein the plurality of directional inlets extend at an angle sideways and downwards from the central conduit into the vortex chamber, exiting near a conical base of the vortex chamber, which results in the formation of the vortex.

6. The method of claim 5, wherein the vortex chamber comprises a cylindrical upper portion and the conical base, wherein a central outlet extends downwards from the conical base, the central outlet comprises gated channels configured to control the flow of water to the plurality of reservoirs.

7. The method of claim 6, wherein water entering the vortex chamber through the plurality of directional inlets forms the vortex, and wherein water exiting through the central outlet and water entering directionally are both acted upon by the Coriolis force, resulting in a summated vortex.

8. The method of claim 7, wherein the plurality of reservoirs comprises three reservoirs, the one or more reservoir inlets comprise three reservoir inlets, and the one or more reservoir outlets comprise three reservoir outlets.

9. The method of claim 8, wherein the three reservoir inlets are positioned at different heights.

10. The method of claim 7, wherein the method further comprises:
- regulating the flow of water through the vortex chamber and the plurality of reservoirs using pump-assisted buoyant valve locks.

11. A system of harnessing and converting low head potential energy of water into kinetic energy and electricity, the system comprising:
- a turbine housing;
- a vortex chamber encased within the housing;
- one or more reservoir inlets in fluid communication with the vortex chamber, the one or more reservoir inlets configured in the turbine housing spatially below the vortex chamber;
- a central conduit circumferentially positioned around the vortex chamber;
- one or more reservoir outlets extend spatially upwards from the central conduit, the one or more reservoir outlets are in fluid communication with the central conduit;
- a plurality of directional inlets, spaced apart from each other, extend from the central conduit and open in the vortex chamber; and
- a turbine positioned within the vortex chamber and operationally coupled to a generator.

12. The system of claim 11, further comprising:
- an overhead gantry mounted above the turbine housing, and the generator is encased within the overhead gantry.

13. The system of claim 11, wherein the system comprises a tide capture/release algorithm stored in a memory and executable by a processor for controlling flow of water down a potential water column difference through the vortex chamber for rotating the turbine.

14. The system of claim 13, wherein the plurality of directional inlets are configured to allow water to enter the vortex chamber such that the flow of water through the vortex chamber results in the formation of a vortex that drives the turbine.

15. The system of claim 14, wherein the plurality of directional inlets extend at an angle sideways and downwards from the central conduit into the vortex chamber, exiting near a conical base of the vortex chamber.

16. The system of claim 15, wherein the vortex chamber comprises a cylindrical upper portion and the conical base, wherein a central outlet extends downwards from the conical base, the central outlet comprises gated channels configured to control the flow of water to the plurality of reservoirs.

17. The system of claim 16, wherein the vortex chamber, the plurality of directional inlets, and the central outlet are configured such that water entering the vortex chamber through the plurality of directional inlets forms the vortex, and wherein water exiting through the central outlet and water entering directionally are both acted upon by the Coriolis force, resulting in a summated vortex.

18. The system of claim 17, wherein the plurality of reservoirs comprises three reservoirs, the one or more reservoir inlets comprise three reservoir inlets, and the one or more reservoir outlets comprise three reservoir outlets.

19. The system of claim 18, wherein the three reservoir inlets are positioned at different heights.

* * * * *